2,815,385

PROCESS FOR THE PRODUCTION OF 2-CHLORO-ACROLEIN AND DERIVATIVES THEREOF

Howard R. Guest, Charleston, and Harry A. Stansbury, Jr., South Charleston, W. Va., assignors to Union Carbide Corporation, a corporation of New York No Drawing. Application January 6, 1955, Serial No. 480,295

7 Claims. (Cl. 260—601)

This invention relates to an improved method for making 2-chloroacrolein and derivatives thereof as well as to certain novel derivatives obtained thereby.

Acrolein, which is useful as a starting material in the method of the invention, can be chlorinated readily to form 2,3-dichloropropionaldehyde with high yields. This reaction is represented by the equation:

$$CH_2{:}CHCHO + Cl_2 \rightarrow CH_2ClCHClCHO$$

Earlier attempts to dehydrochlorinate the dichloropropionaldehyde by heating with water according to the reaction $$CH_2ClCHClCHO \xrightarrow{Hot\ H_2O} CH_2{:}CClCHO + HCl$$

to form 2-chloroacrolein have met with only partial success and considerable difficulty because of the tendency of the 2-chloroacrolein to polymerize readily, particularly in the presence of the aqueous hydrogen chloride formed in the reaction. The heretofore suggested use of an alkaline salt, such as sodium acetate, to neutralize the hydrochloric acid has the serious disadvantage of contaminating the 2-chloroacrolein with acetic acid. Because of the proximity of the boiling points of these two materials, acetic acid cannot be efficiently separated from 2-chloroacrolein by fractional distillation.

The surprising discovery has now been made that, by carrying out the dehydrochlorination of 2,3-dichloropropionaldehyde in the presence of certain solvents, the use of alkaline material to neutralize the hydrochloric acid formed in the dehydrochlorination can be avoided and 2-chloroacrolein can be obtained in yields higher than heretofore considered possible. The solvents which have been found most effective and are therefore preferred in the method of the invention are saturated, chlorinated hydrocarbons that are immiscible with water, have a specific gravity greater than one, have a boiling point above 110° C. (the boiling point of 2-chloroacrolein), and are inert to the reactants and reaction products under the conditions of reaction.

Typical solvents which meet these requirements are 1,1,2-trichloroethane, 1,1,2,2-tetrachloroethane, di-(2-chloroethyl)ether, and di-(2-chloroisopropyl)ether. It is, however, also possible to use inert solvents such as benzene, carbon tetrachloride, ethylene dichloride and propylene dichloride, which have boiling points below 110° C., provided certain precautions are taken to insure vaporization of the 2-chloroacrolein at substantially the rate it is formed in the dehydrochlorination. It is also within the scope of the invention to use inert solvents such as toluene (B. P. 111° C.), ethylbenzene (B. P. 136° C.), butyl ether (B. P. 142° C.), xylenes (B. P. 138°–144° C.) and nonane (B. P. 151° C.), which have a specific gravities less than one. These solevnts, while operable, are not preferred because they do not provide as sharp a separation, in the dehydrochlorination distillate, between the water layer and the layer of solvent and 2-chloroacrolein. Generally, therefore, solvents are operable in the improved method of the invention, that are inert to the reactants and reaction products under the reaction conditions and are immiscible with water.

While it is to be understood that the invention is not to be limited by any theory advanced herein, it is believed that the high yields of 2-chloroacrolein obtained in accordance with this process are possible because, under the conditions of the dehydrochlorination, the 2-chloroacrolein is flash-distilied from the kettle substantially as quickly as it is formed and thus vaporized and condensed in a dilute form without being given an opportunity to polymerize under the influence of the hydrochloric acid. When a solvent having a boiling point below 110° C. is employed, the yield is deteriously affected unless a considerable excess of the solvent is employed to avoid allowing the 2-chloroacrolein to remain in the hot kettle after it is formed and therefore, subject to polymerization in the presence of the hydrochloric acid.

If the boiling point of the solvent used is below 110° C., then the weight of solvent should be substantially greater than the weight of acrolein initially employed, the weight of solvent being greater the lower the boiling point is. Thus, for example, if benzene or ethylene dichloride, which boil in the vicinity of 80° C., are employed, the amount of diluent should be at least about twice and preferably three times the weight of acrolein initially used.

The 2-chloroacrolein obtained in accordance with the improved mthod of the invention may, while remaining in the presence of the solvent, be converted into 2-chloroallylidene diacetate by reaction with acetic anhydride ac-according to the equation:

$$CH_2{:}CClCHO + (CH_3CO)_2O \rightarrow CH_2{:}CClCH(OOCCH_3)_2$$

The presence of the solvent also facilitates reaction of the 2-chloroacrolein with hydrogen cyanide to prepare 2-chloroacrolein cyanohydrin according to the equation:

$$CH_2{:}CClCHO + HCN \rightarrow CH_2{:}CClCHOHCN$$

The 2-chloroacrolein may also be converted by heat treatment, first into a dimer and finally into 5-chloro-2-formyl-4H-pyran according to the following equation:

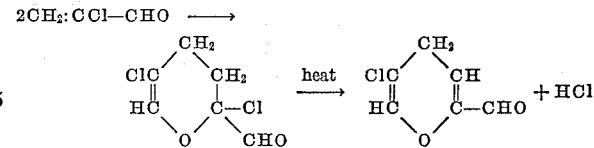

The advantages and utility of the invention wiill become further apparent from the detailed description in the following examples, it being understood however the invention is not to be limited to the specific disclosures in the examples but that these are merely illustrative of preferred modes of operation..

*Example 1.—Preparation of 2-chloroacrolein in the presence of di-(2-chloroethyl)ether*

251 grams of 89.3% acrolein (4 moles) dissolved in 502 gms,. of di(2-chloroethyl)ether were chlorinated with chlorine gas at 0° C. until 283 gms. (4 moles) chlorine were absorbed to form 2,3-dichloropropionaldehyde. The crude solution was fed to 3 liters of water containing 0.1% hydroquinone inhibitor while refluxing at atmospheric pressure in a still fitted with a brine-cooled condenser and a decanter. The lower oil layer of the distillate was removed continuously while the aqueous layer was returned to the column as reflux. After a feed period of 2 hours, the distillation was continued for 30 minutes longer to exhaust all oil from the condensate. Analysis of the oil layer (824 gms.) for aldehyde indicated it was 42.7% 2-chloroacrolein, which corresponded to a 97% theoretical yield, based on acrolein. The oil, containing hydroquinone, was distilled under reduced pressure to obtain 78% of the contained 2-chloroacrolein as a fraction having a purity of 98%, while 10% of the contained aldehyde was accounted for in the mid-fraction containing di-(2-chloroethyl)ether.

*Example 2.—Preparation of 2-chloroacrolein in the presence of benzene*

114 grams of 97% acrolein (2 moles) dissolved in 228 gms. of benzene were chlorinated at 0° C. until 142 gms. (2 moles) chlorine were absorbed to form 2,3-dichloropropionaldehyde. The crude solution was fed to 2 liters of water containing hydroquinone refluxing in a still fitted with a brine-cooled condenser and a decanter. The oil layer of the condensate was taken off continuously into a receiver containing hydroquinone and cooled at 0° C. After a feed period of 2 hours, the distillation was continued for 20 minutes to exhaust the oil from the system. Since some water layer was taken off with the oil layer, it was separated and extracted with 100 cc. of benzene. The collected oil and extract were combined to give a total of 445 gms. of solution which was 32.6% 2-chloroacrolein by analysis. This corresponded to a yield and efficiency of 80% based on acrolein.

*Example 3.—Continuous dehydrochlorination in the presence of 1,1,2,2-tetrachloroethane and preparation of 2-chloroacrolein cyanohydrin*

261 gms. 89.3% acrolein (4 moles) dissolved in 496 gms. of 1,1,2,2-tetrachloroethane solvent were chlorinated at 0° C. until 283 gms. (4 moles) chlorine were obsorbed to form 2,3-dichloropropionaldehyde. The crude solution was fed to 3 liters of water containing 3 gms. of hydroquinone refluxing in a still fitted with a brine-cooled condenser and a decanter. The lower oil layer of the condensate was taken off continuously into a receiver containing hydroquinone and cooled to 0° C. The feed period was 4 hours and the distillation was continued for 30 minutes longer to exhaust the oil from the system. The collected condensate (823 gms.) was 41.5% 2-chloroacrolein, which corresponded to a yield and efficiency of 94.3% based on acrolein.

The resulting solution, containing 3.77 moles 2-chloroacrolein, was mixed with 112 gms. hydrogen cyanide. This mixture was fed to a solution of 7.7 gms. of an alkylpyridine catalyst of equivalent weight 194 (.04 equivalents) in 100 gms. of 1,1,2,2-tetrachloroethane solvent while stirring at 14°-19° C. The addition required 1.3 hours. After a reaction period of 15 minutes, the mixture was acidified with 5 cc. of concentrated hydrochloric acid. The solution was distilled under reduced pressure to obtain 2-chloroacrolein cyanohydrin having a refractive index $n_D^{30}$ of 1.4661, a specific gravity 20/20° of 1.246, and a boiling range at 9 mm. absolute of 98°-104° C. The yield and efficiency were 75% of theoretical based on 2-chloroacrolein and 71% of theoretical based on acrolein.

*Example 4.—Continuous dehydrochlorination in the presence of 1,1,2-trichloroethane and preparation of 2-chloroallylidene diacetate*

125 gms. of 89.3% acrolein (2 moles) dissolved in 250 gms. of 1,1,2-trichloroethane were chlorinated at 0° C. until 143 gms. (2 moles) chlorine were absorbed. The resulting solution of 2,3-dichloropropionaldehyde was fed to 1.5 liters of water refluxing on a still fitted with a brine-cooled condenser. The oil layer of the condensate was taken off continuously while the water layer was returned to the column as reflux. After a feed period of 1 hour and a distillation time of 30 minutes longer, no more oil was being distilled. The collected oil was dried completely by distillation of a wet fore-fraction under a reduced pressure of 50 mm.

The anhydrous solution, which weighed 400 gms. and contained 42.6% (1.88 moles) 2-chloroacrolein by analysis, was fed over a period of 40 minutes to a mixture of 767 gms. acetic anhydride (7.52 moles) and 2 ml. concentrated sulfuric acid (0.075 equivalents) while stirring at 40° C. A reaction time of 2 hours at 45° C. followed. The mixture was then treated with 8.2 gms. anhydrous sodium acetate (0.1 equivalents) and fractionated under reduced pressure to obtain 2-chloroallylidene diacetate in 71% over-all yield and 79% efficiency based on acrolein. This product was colorless and had the following properties: boiling point at 5 mm. absolute, 70° C.; refractive index $n_D^{30}$, 1.4385; specific gravity 20/20°, 1.213. The 2-chloroallylidene diacetate was found to copolymerize readily with vinyl chloride to form resins of outstanding heat stability, the copolymerization rate being about three times the homopolymerization rate of the vinyl chloride.

*Example 5.—Continuous dehydrochlorination in the presence of ethylene dichloride and preparation of 2-chloroallylidene diacetate*

177 gms. of 97% acrolein (3 moles) dissolved in 562 gms. ethylene dichloride (1,2-dichloroethane) were chlorinated at 0° C. until 213 gms. (3 moles) chlorine were absorbed. The resulting 2,3-dichloropropionaldehyde solution was fed to 2 liters of water containing 0.1% hydroquinone refluxing in a still fitted with a brine-cooled condenser and a decanter. The lower oil layer was taken off continuously into a bottle containing hydroquinone and stored in an ice-bath. The feed period of 1.6 hours was followed by 30 minutes more of distillation time to exhaust the oil from the condensate. The collected oil layer weighed 824 gms. and contained 264 gms. 2-chloroacrolein, or 97% of the theoretical yield based on acrolein.

The oil was fed dropwise over a period of 30 minutes to a mixture of 612 gms. acetic anhydride (6 moles) and 9.2 gms. concentrated sulfuric acid (0.188 equivalents, 0.64% of total charge) while stirring at 30°-35° C. After a reaction period of an hour at 30°-35° C., the mixture was treated with 17 gms. of anhydrous soldium acetate (0.21 equivalents) and distilled under reduced pressure to isolate 2-chloroallylidene diacetate with 71% overall yield and efficiency based on acrolein.

*Example 6.—Stability of 2-chloroacrolein and preparation of 5-chloro-2-formyl-4H-pyran*

99% pure 2-chloroacrolein containing 1% hydroquinone was heated at 75° C. in glass for 6 hours. Analysis for aldehyde at the end of this time indicated a purity of 81.7%. After heating 7.5 hours longer at 75° C., the purity had decreased to 43.4%. The viscous mixture so obtained was distilled under reduced pressure to obtain the following fractions: 7% monomeric 2-chloroacrolein, 35% dimer, and 58% polymeric residue and gaseous material.

The dimer fraction, which partially solidified upon standing, was redistilled to obtain a crystalline fraction of 5-chloro-2-formyl-4H-pyran having a boiling point at 9 mm. absolute of 70°-90° C. After traces of the liquid dimer were washed out with ethyl ether, the crystals which were colorless, had a melting point of 68°-79° C. Analysis of the product showed 24.7% chlorine (theory 24.6%), 49.8% carbon (theory 49.8%) and 3.5% hydrogen (theory 3.5%). The assigned structure was confirmed by both infrared and mass spectographic studies. The overall yield to the crystalline 5-chloro-2-formyl-4H-pyran was 20% based on 2-chloroacrolein.

It is to be expected that modifications of the method described herein will readily occur to those skilled in the art upon reading this description. All such modifications are intended to be included within the scope of the invention as defined in the accompanying claims.

We claim:

1. In a method of preparing 2-chloroacrolein comprising the steps of chlorinating acrolein to form 2,3-dichloropropionaldehyde and dehydrochlorinating 2,3-dichloropropionaldehyde by distillation with hot water, the improvement which comprises effecting the distillation in the presence of a solvent selected from the group consisting of inert and water-immiscible hydrocarbons, chlorinated hydrocarbons, ethers and chlorinated ethers.

2. In a method of preparing 2-chloroacroelein comprising the steps of chlorinating acrolein to form 2,3-dichloropropionaldehyde and dehydrochlorinating the aldehyde to 2-chloroacroelin, the improvement which comprises dehydrochlorinating the aldehyde by distillation with hot water in the presence of a solvent selected from the group consisting of inert and water-immiscible hydrocarbons, chlorinated hydrocarbons, ethers and chlorinated ethers.

3. Method as defined in claim 1 wherein the solvent is benzene and the weight of solvent employed is at least about twice the weight of acroelin initially used.

4. Method as defined in claim 1 wherein the solvent is ethylene dichloride and the weight of solvent employed is at least about twice the weight of acroelin initially used.

5. Method as defined in claim 1 wherein the solvent is 1,1,2-trichloroethane.

6. Method as defined in claim 1 wherein the solvent is 1,1,2,2-tetrachloroethane.

7. Method as defined in claim 1 wherein the solvent is di(2-chloroisopropyl)ether.

References Cited in the file of this patent

UNITED STATES PATENTS

| | | |
|---|---|---|
| 1,806,285 | Ernst | May 19, 1931 |
| 2,090,942 | Fick | Aug. 24, 1937 |
| 2,368,186 | Wickert | Jan 30, 1945 |
| 2,427,492 | Bremner et al. | Sept. 16, 1947 |
| 2,479,284 | Whetstone | Aug. 16, 1949 |
| 2,483,852 | Smith | Oct. 4, 1949 |
| 2,513,090 | Finch | June 27, 1950 |
| 2,537,814 | Davis | Jan. 9, 1951 |

FOREIGN PATENTS

| | | |
|---|---|---|
| 896,193 | Germany | Nov. 9, 1953 |